United States Patent
Heimann

(10) Patent No.: US 9,694,471 B2
(45) Date of Patent: Jul. 4, 2017

(54) BURNISHING HEAD

(75) Inventor: Alfred Heimann, Aachen (DE)

(73) Assignee: Hegenschneidt-MFD GmbH & Co. KG, Erkelenz (DE)

( * ) Notice: Subject to any disclaimer, the term of this patent is extended or adjusted under 35 U.S.C. 154(b) by 830 days.

(21) Appl. No.: 14/235,553

(22) PCT Filed: Jul. 20, 2012

(86) PCT No.: PCT/DE2012/000749
§ 371 (c)(1),
(2), (4) Date: May 21, 2014

(87) PCT Pub. No.: WO2013/013658
PCT Pub. Date: Jan. 31, 2013

(65) Prior Publication Data
US 2014/0338164 A1    Nov. 20, 2014

(30) Foreign Application Priority Data
Jul. 28, 2011   (DE) .................... 20 2011 103 890 U

(51) Int. Cl.
*B24B 39/00* (2006.01)
*B24B 39/02* (2006.01)
(Continued)

(52) U.S. Cl.
CPC .......... *B24B 39/023* (2013.01); *B24B 39/003* (2013.01); *B24B 39/06* (2013.01);
(Continued)

(58) Field of Classification Search
CPC ...... F16C 2223/04; F16C 3/06; B24B 39/003; B24B 39/023; B24B 39/06; B24B 5/42;
(Continued)

(56) References Cited

U.S. PATENT DOCUMENTS 6,101,696 A * 8/2000 Carter ..................... B21C 37/30
29/90.01
6,283,838 B1 * 9/2001 Blake ....................... B24B 7/17
451/168
(Continued)

FOREIGN PATENT DOCUMENTS

DE          240085     *  7/1975  ............. B24B 39/00
DE       2400855 A1       7/1975
(Continued)

OTHER PUBLICATIONS

STIC NPL reference search, Oct. 5, 2015, pp. 1-10.*
(Continued)

*Primary Examiner* — Christopher Besler
*Assistant Examiner* — Bayan Salone
(74) *Attorney, Agent, or Firm* — Harness, Dickey & Pierce, P.L.C.

(57) ABSTRACT

This invention concerns a burnishing head for smooth rolling of the ring-shaped flat end faces (3, 4) at the thrust bearing of crankshafts by means of two cylindrical burnishing rollers (1, 2) which are arranged to be rotated and are side by side in parallel to each other within a burnishing head housing (12) that is pivotable about its longitudinal axis (20) to reach its working position. Each burnishing roller (1, 2) is pivoted in a cage (10, 11) which is provided in the burnishing head housing (12) with low play (13) and lateral relocatability.

13 Claims, 1 Drawing Sheet

Figure 1:
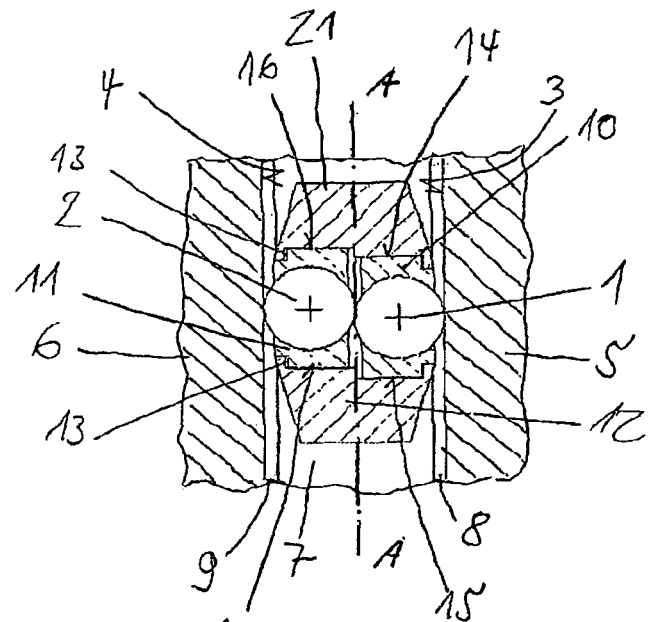

(51) Int. Cl.
*B24B 39/06* (2006.01)
*F16C 3/06* (2006.01)

(52) U.S. Cl.
CPC ............ *F16C 3/06* (2013.01); *F16C 2223/04* (2013.01); *F16C 2223/06* (2013.01); *Y10T 29/47* (2015.01); *Y10T 29/49286* (2015.01); *Y10T 29/49636* (2015.01); *Y10T 29/49643* (2015.01); *Y10T 29/49645* (2015.01)

(58) Field of Classification Search
CPC ......... Y10T 29/49286; Y10T 29/49636; Y10T 29/47; Y10T 29/49643; Y10T 29/49645; B21C 37/30; B23P 9/02; B23P 9/025
USPC ............ 29/90.01–90.6, 888.08, 898, 898.04, 29/898.041; 72/75, 110
See application file for complete search history.

(56) References Cited

U.S. PATENT DOCUMENTS

| | | | | |
|---|---|---|---|---|
| 7,021,100 | B2 * | 4/2006 | Heimann | B21H 7/185 72/110 |
| 9,015,939 | B2 * | 4/2015 | Reeb | B21H 7/185 29/402.06 |
| 9,156,128 | B2 * | 10/2015 | Sakaguchi | B24B 39/06 |
| 2002/0189312 | A1 * | 12/2002 | Heimann | B21H 7/185 72/110 |
| 2010/0146753 | A1 * | 6/2010 | Reeb | B21H 7/185 29/6.01 |

FOREIGN PATENT DOCUMENTS

| | | | |
|---|---|---|---|
| DE | WO 03057400 A1 * | 7/2003 | ............... B23B 5/18 |
| DE | 202011004718 U1 * | 9/2011 | ............ B24B 39/06 |
| DE | 202011004718 U1 | 9/2011 | |
| WO | WO-03/057400 A1 | 7/2003 | |

OTHER PUBLICATIONS

STIC Patents reference search, Oct. 6, 2015, pp. 1-11.*
DE 2400855, Smooth Rolling Tool for Stepped Bores, Dombrowski, Theodor, EPO English Machine Translation, pp. 1-12.*
International Search Report for PCT/DE2012/000749, ISA/EP, Rijswijk, NL, mailed Dec. 17, 2012.
"Universelle Feindreh & Glattwalzmaschine fuer die Kurbenwellen-Fertigung; MoDellreihe 7794", Internet Citation, Feb. 2001 (Feb. 2001), XP002239218, Retrieved from the Internet: URL:http://www.hegenscheidt-mfd.de/de/maschinen/pdf/7794_de.pdf [retrieved on Apr. 24, 2003] the whole document.
Hegenscheidt MFD, "Fine turning and roller burnishing machine type 7794", (http://www.hegenscheidt-mfd.de), downloaded Jan. 27, 2014.
English Translation of the International Preliminary Report on Patentability PCT/DE2012/000749 (Chapter 1 of the Patent Cooperation Treaty), issued Jan. 28, 2014.

* cited by examiner

BURNISHING HEAD

CROSS-REFERENCE TO RELATED APPLICATIONS

This is a U.S. National Phase Application under 35 USC 371 of PCT/DE2012/000749, filed on Jul. 20, 2012 and published in German as WO/2013/013658 on Jan. 31, 2013. This application claims priority to German Application No. 20 2011 103 890.8, filed on Jul. 28, 2011. The disclosures of the above applications are incorporated herein by reference.

FIELD

This invention concerns a burnishing head for smooth rolling of the ring-shaped flat end faces at the thrust bearing of crankshafts by means of two cylindrical burnishing rollers which are arranged to be rotated and are side by side in parallel to each other within a burnishing head housing that is pivotable about its longitudinal axis to reach its the working position.

BACKGROUND

A burnishing head in its usual design must be adjusted perpendicularly to the rotation axis of the crankshaft for finish rolling. Due to the required accuracy, this is not possible without an adjusting gauge. If the adjustment is missing or incorrect, your results of the smoothing will be uneven.

This invention is therefore intended to prevent unsatisfactory smoothing results.

SUMMARY

The proposed solution is that each burnishing roller is pivoted in a cage which is laterally relocatable with slight play in the burnishing head housing.

Among the advantages of this solution is that the laterally relocatable cage has been equipped with at least one strip-shaped projection that extends transversely to the rotation axis of the burnishing roller and engages in a groove of the burnishing head housing.

As is known, each burnishing roller is pivoted in the cage with a cylindrical section. At this cylindrical section of the burnishing roller, a safeguard against falling out is provided. As a safeguard against burnishing rollers falling out, a hexagon head cap is screw is proposed.

DRAWINGS

The invention is described in detail below using a design example. The following figures are shown nearly to scale but simplified:

FIG. 1 the front view of the burnishing head

Figure 2:
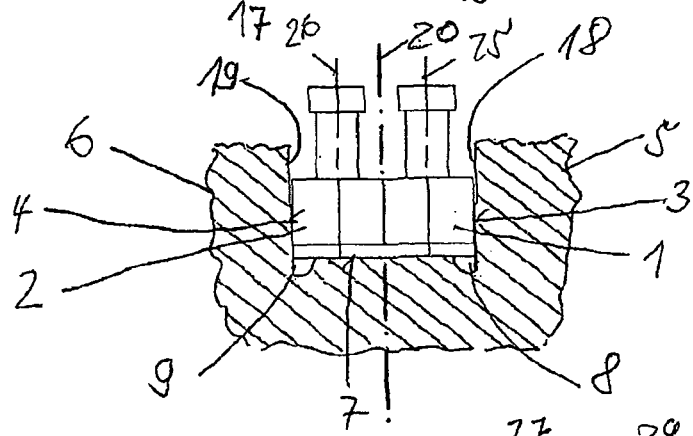

FIG. 2 a view from above of the burnishing head

Figure 3:
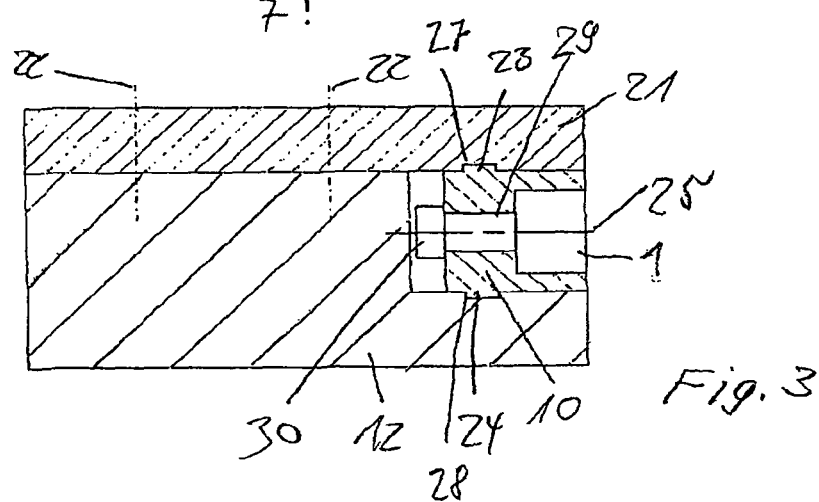

FIG. 3 a longitudinal section through the burnishing head along line A-A FIG. 1

DETAILED DESCRIPTION

Two burnishing rollers 1 and 2 are provided to finish the ring-shaped flat end faces 3 and 4 at the crank webs 5 and 6. At the transitions between crank webs 5 and 6 and thrust bearing 7, recesses 8 and 9, respectively, are present.

Each work roller 1 and 2 is, with respect to the burnishing head housing 12, pivoted in a laterally movable cage 10 or 11. Play 13, which is present in both cage 10 and cage 11, is intended for lateral relocatability. The size of play 13 is between 0.1 mm and 0.5 mm, whereby 0.3 mm is optimal. In this way, cages 10 and 11 are supported by flat surfaces 14, 15 or 16, 17 and are thus movable and pivotable on a plane through the crankshaft axis (not shown). In this way, the burnishing rollers 1 and 2 align themselves solely by the position of oil flanges 18 and 19; that is, an adjusting gauge for exact alignment of the burnishing head housing 12 is no longer required. Between the main rotation axis (not shown) of the crankshaft (not shown) and pivot axis 20, around which the burnishing head is pivotable in its working position, a strict perpendicular alignment is no longer required.

The burnishing head housing consists of one lower part 12 and one part 21 which is screwed onto it. Screws 22 are provided for this connection. The longitudinally relocatable cages 10 and 11 each have projections 23 and 24 which extend transversely to the rotation axis 25 and 26, respectively, of work rollers 1 and 2. The corresponding grooves 27 and 28 in the burnishing head housing 12 and/or in the screwed-on part 21 accommodate projections 23 and 24 of cages 10 and 11.

The work rollers 1 and 2 are pivoted in cage 10 and 11 with a cylindrical section 29. A safeguard in the form of a hexagon head cap screw 30 ensures that the burnishing rollers 1 or 2 cannot fall out of cages 10 and 11, respectively.

The invention claimed is:

1. A self-aligning burnishing head comprising:
   a housing extending along a longitudinal axis;
   a plurality of cages supported within the housing, wherein each cage is moveable within the housing in a direction lateral to the longitudinal axis;
   a working roller supported by each cage such that the working rollers are arranged in parallel and adjacent to one another, each working roller being rotatable about a rotation axis that is parallel to the longitudinal axis; and
   wherein the burnishing head is pivotable about a pivot axis that is parallel to the longitudinal axis.

2. The self-aligning burnishing head according to claim 1, wherein the plurality of cages comprises exactly two cages.

3. The self-aligning burnishing head according to claim 1, wherein each cage comprises at least one strip-shaped projection extending transversely to the rotation axis of the working roller; and
   wherein the at least one strip-shaped projection is positioned in a corresponding groove in the housing.

4. The self-aligning burnishing head according to claim 1, wherein the working roller comprises a cylindrical section; and
   wherein the working roller is supported in the at least one cage at the cylindrical section.

5. The self-aligning burnishing head according to claim 4, wherein the working roller further comprises a safeguard for preventing the working roller from falling out of the cage; and
   wherein the safeguard is provided at the cylindrical section of the working roller.

6. The self-aligning burnishing head according to claim 5, wherein the safeguard comprises a hexagon head cap screw.

7. The self-aligning burnishing head according to claim 1, wherein the plurality of cages comprises two cages;
   wherein each cage comprises first and second strip-shaped projections, each strip-shaped projection extending transversely to the rotation axis of the working roller, the first strip-shaped projection being located on a first side of the cage and the second strip-shaped projection being located on a second side of the cage opposite to the first side; and wherein the first strip-shaped projection is positioned in a first corresponding groove in the housing and the second strip-shaped projection is positioned in a second corresponding groove in the housing.

8. The self-aligning burnishing head according to claim 7, wherein the housing comprises a first housing part and a second housing part attached to the first housing part; and wherein each of the first and second housing parts includes one of the first and second grooves.

9. The self-aligning burnishing head according to claim 7, wherein the first strip-shaped projection has a first width dimension in a direction lateral to the longitudinal axis;

wherein the first groove has a second width dimension in a direction lateral to the longitudinal axis; and wherein the first width dimension is less than the second width dimension such that a first gap is created between the first strip-shaped projection and the first groove.

10. The self-aligning burnishing head according to claim 9, wherein the second strip-shaped projection has a third width dimension in a direction lateral to the longitudinal axis;

wherein the second groove has a fourth width dimension in a direction lateral to the longitudinal axis; and wherein the third width dimension is less than the fourth width dimension such that a second gap is created between the second strip-shaped projection and the second groove.

11. The self-aligning burnishing head according to claim 10, wherein each of the first gap and the second gap is between 0.1 mm and 0.5 mm.

12. The self-aligning burnishing head according to claim 10, wherein at least one of the first gap and the second gap is about 0.3 mm.

13. The self-aligning burnishing head according to claim 10, wherein each of the first gap and the second gap is about 0.3 mm.

* * * * *

UNITED STATES PATENT AND TRADEMARK OFFICE
CERTIFICATE OF CORRECTION

PATENT NO. : 9,694,471 B2  
APPLICATION NO. : 14/235553  
DATED : July 4, 2017  
INVENTOR(S) : Alfred Heimann It is certified that error appears in the above-identified patent and that said Letters Patent is hereby corrected as shown below:

On the Title Page

In Column 1, (73) Assignee, "Hegenschneidt-MFD" should be replaced with --Hegenscheidt-MFD--.

In Column 1, (30) Foreign Application Priority Data, the phrase "20 2011 103 890 U" should be replaced with --20 2011 103 890.8--.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*